(12) United States Patent
Hirota et al.

(10) Patent No.: US 7,148,936 B1
(45) Date of Patent: Dec. 12, 2006

(54) COLOR-SEPARATION/SYNTHESIS OPTICAL SYSTEM WITH PARTICULAR CUT-OFF WAVELENGTHS AND EMISSION-SIDE POLARIZER AND PROJECTION TYPE LIQUID CRYSTAL DISPLAY DEVICE USING THE SAME

(75) Inventors: Shoichi Hirota, Hitachi (JP); Iwao Takemoto, Mobara (JP); Hideki Nakagawa, Chiba (JP); Katsuhide Aoto, Chiba (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 10/255,934

(22) Filed: Sep. 27, 2002

(30) Foreign Application Priority Data

Mar. 4, 2002 (JP) ............................. 2002-057092

(51) Int. Cl.
*G02F 1/1335* (2006.01)
(52) U.S. Cl. .......................................................... 349/9
(58) Field of Classification Search ................. 349/9
See application file for complete search history.

(56) References Cited

U.S. PATENT DOCUMENTS

| | | | |
|---|---|---|---|
| 5,751,384 A | 5/1998 | Sharp | |
| 6,183,091 B1 | 2/2001 | Johnson et al. | |
| 6,394,606 B1 * | 5/2002 | Miyawaki et al. | 353/20 |
| 6,704,065 B1 * | 3/2004 | Sharp et al. | 349/5 |
| 2001/0000971 A1 * | 5/2001 | Johnson et al. | 349/117 |
| 2001/0028416 A1 * | 10/2001 | Divelbiss et al. | 349/43 |

* cited by examiner

*Primary Examiner*—Frank G. Font
*Assistant Examiner*—Timothy L. Rude
(74) *Attorney, Agent, or Firm*—Dickstein Shapiro LLP

(57) ABSTRACT

The present invention provides a projection type liquid crystal display device capable of achieving a high contrast ratio without causing optical leakage on boundary wavelength regions of three color light components in the case of a black display. The projection type liquid crystal display device is provided with a first and a second retarder stacks each of which has cut-off wavelengths. The cut-off wavelength on the short wavelength side of the first retarder stack is placed on a shorter wavelength side as compared with the cut-off wavelength on the short wavelength side of the second retarder stack, and the cut-off wavelength on the long wavelength side of the first retarder stack is placed on a longer wavelength side as compared with the cut-off wavelength on the long wavelength side of the second retarder stack.

3 Claims, 9 Drawing Sheets

COLOR-SEPARATION/SYNTHESIS OPTICAL SYSTEM WITH PARTICULAR CUT-OFF WAVELENGTHS AND EMISSION-SIDE POLARIZER AND PROJECTION TYPE LIQUID CRYSTAL DISPLAY DEVICE USING THE SAME

BACKGROUND OF THE INVENTION

The present invention relates to a projection type liquid crystal display device for projecting an image which is formed in a liquid crystal display element on a screen by illuminating the liquid crystal display element with light which is emitted from a light source and, particularly, to an optical system in the projection type liquid crystal display device.

One of the important factors for wide-spread use of projection type liquid crystal display devices, which are suitably used for a large screen image display, is a reduction in cost.

The most effective measure for the reduction in cost is miniaturization of a liquid crystal display element and miniaturization of a projection optical system involved therein. At the same time, a high definition display having a high pixel density such as that achieved by a high quality television is in demand. A reflection type liquid crystal display element is characterized in that it maintains, even if it is a small and high-definition element, an aperture ratio higher than that of a transmission type liquid crystal display element by covering almost all of pixels with electrodes which are also used as reflection plates. Therefore, it can be said that the reflection type liquid crystal display element is the most ideal element for a small and high-definition projection type liquid crystal display device. Examples of the prior art of the projection optical system for the projection type liquid crystal display device using the reflection type liquid crystal display element include Japanese Patent Laid-open No. 8-271854; Japanese Patent Laid-open No. 10-20273; U.S. Pat. No. 6,183,091; WO99/19758; P. M. Alt, Conference Record of the 1997 International Display Research Conference, M19-M28 (1997); R. L. Melcher, SID 98 Digest, pp. 25–28 (1998) and so forth. In particular, the projection optical system disclosed in U.S. Pat. No. 6,183, 091 is characterized by a wavelength separation which is performed by effectively using a retarder stack and a polarizing beamsplitter. The retarder stack means an optical element formed by laminating a multiple of phase difference films having reflective index anisotropy properties, the retarder stack having a function of varying a phase difference of a light component selected from three color light components by $\pi$ with respect to another one of the three color light components. Details of the retarder stack can be found in U.S. Pat. No. 5,751,384.

The projection optical system disclosed in U.S. Pat. No. 6,183,091, however, has the following problems. The projection optical system, which comprises a separation/synthesis system for three color light components having a polarizing beamsplitter, an input retarder stack disposed adjacent to a first sideface of the polarizing beamsplitter, a spacer disposed adjacent to a second sideface of the polarizing beamsplitter, a dichroic beamsplitter disposed adjacent to a third sideface of the polarizing beamsplitter and an output retarder stack disposed adjacent to a fourth sideface of the polarizing beamsplitter, cannot achieve a high contrast ratio since an optical leakage occurs in boundary wavelength regions of the three color light components when performing a black display. Further, the projection type liquid crystal display device using the projection optical system has a problem of deterioration in color purity which is caused by a large overlap portion of different colors on the boundary wavelength regions of the three color light components.

Although a prevailed aspect ratio of screens of personal computer monitors or NTSC televisions has been 3:4, a screen used in an application whose main object is image viewing, such as a screen of a high quality television, is in an oblong shape having an aspect ratio of 9:16. Accordingly, a shape of a liquid crystal panel used in such projection type liquid crystal display device is also oblong, leading to a problem of an increase in size of the color-separation/synthesis optical system which is provided in the projection type liquid crystal display.

SUMMARY OF THE INVENTION

A primary object of the present invention is to realize a projection type liquid crystal display device having a high contrast ratio and capable of preventing an optical leakage in boundary wavelength regions of three color light components.

A second object of the present invention is to realize a projection type liquid crystal display device which effectively eliminates light which causes a deterioration in color purity in the boundary wavelength regions of three color light components display images of a high degree of color purity.

A third object of the present invention is to reduce the size of a color-separation/synthesis optical system in a projection type liquid crystal display device which is provided with an oblong liquid crystal panel to thereby reduce the size of the projection type liquid crystal display device.

According to a first aspect of the present invention, there is provided a color-separation/synthesis optical system of the present invention comprising a first retarder stack, a polarizing beamsplitter, a spacer, a dichroic beamsplitter and a second retarder stack, in which the first retarder stack is disposed adjacent to a first sideface of the polarizing beamsplitter; the spacer is disposed adjacent to a second sideface of the polarizing beamsplitter; the dichroic beamsplitter is disposed adjacent to a third sideface of the polarizing beamsplitter; the second retarder stack is disposed adjacent to a fourth sideface of the polarizing beamsplitter; the first sideface and the third sideface of the polarizing beamsplitter face to each other; the second sideface and the fourth sideface of the polarizing beamsplitter face to each other; each of the first retarder stack and the second retarder stack has two cut-off wavelengths in a visible light region; a cut-off wavelength on the short wavelength side of the first retarder stack is on a shorter wavelength side as compared with the cut-off wavelength on the short wavelength of the second retarder stack; and a cut-off wavelength on the long wavelength side of the first retarder stack is on a longer wavelength side as compared with the cut-off wavelength on the long wavelength of the second retarder stack.

According to a second aspect of the present invention, there is provided a projection type liquid crystal display device comprising at least the color-separation/synthesis optical system described above, a white light source, a plurality of liquid crystal panels for three color light components and a projection lens, in which illumination light from the white light source is converted into a p-polarized light component with respect to a bonding interface of the polarizing beamsplitter; the illumination light from the white light source is allowed to enter the polarizing beamsplitter from the first retarder stack-side; a liquid crystal panel for green is disposed on a face opposite to the sideface of the polarizing beamsplitter to which the spacer is adjacent; a liquid crystal panel for red is disposed on a first emission face of the dichroic beamsplitter; a liquid crystal panel for blue is disposed on a second emission face of the dichroic beamsplitter; and an emission-side polarizing plate and the projection lens are disposed adjacent to the second retarder stack in this order.

According to a third aspect of the present invention, there is provided a projection type liquid crystal display device comprising at least the color-separation/synthesis optical system described above, a white light source, a plurality of liquid crystal panels for three color light components and a projection lens, in which illumination light from the white light source is converted into an s-polarized light component with respect to a bonding interface of the polarizing beamsplitter; the illumination light from the white light source is allowed to enter the polarizing beamsplitter from the second retarder stack-side; a liquid crystal panel for green is disposed on a face opposite to the sideface of the polarizing beamsplitter to which the spacer is adjacent; a liquid crystal panel for red is disposed on a first emission face of the dichroic beamsplitter; a liquid crystal panel for blue is disposed on a second emission face of the dichroic beamsplitter; and an emission-side polarizing plate and the projection lens are disposed adjacent to the first retarder stack in this order.

According to a fourth aspect of the present invention, there is provided a color-separation/synthesis optical system comprising a first retarder stack, a polarizing beamsplitter, a spacer, a dichroic beamsplitter and a second retarder stack, in which the first retarder stack is disposed adjacent to a first sideface of the polarizing beamsplitter; the spacer is disposed adjacent to a second sideface of the polarizing beamsplitter; the dichroic beamsplitter is disposed adjacent to a third sideface of the polarizing beamsplitter; the second retarder stack is disposed adjacent to a fourth sideface of the polarizing beamsplitter; the first sideface and the third sideface of the polarizing beamsplitter face to each other; the second sideface and the fourth sideface of the polarizing beamsplitter face to each other; each of the first retarder stack and the second retarder stack has two cut-off wavelengths in a visible light region; a cut-off wavelength on the long wavelength side of the first retarder stack is on a longer wavelength side with respect to a bonding interface of the dichroic beamsplitter as compared with the cut-off wavelength of s-polarized light component; and a cut-off wavelength on the short wavelength side of the first retarder stack is on a shorter wavelength side with respect to a bonding interface of the dichroic beamsplitter as compared with the cut-off wavelength of a p-polarized light component.

Preferably, the cut-off wavelengths of the dichroic beamsplitter in the above color-separation/synthesis optical system are cut-off wavelengths of the dichroic beamsplitter for light at an angle diverted from a main optical axis of the bonding interface of the dichroic beamsplitter by a degree corresponding to illumination divergence which is defined by an f-number of an illuminating optical system.

Preferably, in the color-separation/synthesis optical system in the projection type liquid crystal display device of the present invention, a face including optical axes of light components passing through and reflected by the boning interface of the polarizing beamsplitter and a face including optical axes of light components passing through and reflected by the bonding interface of the dichroic beamsplitter are disposed in such a manner as to form an angle of about 90 degrees with each other.

Preferably, a third retarder stack for shifting a phase of a red light component from that of a blue light component by $\pi$ is disposed between the polarizing beam splitter and the dichroic beam splitter.

According to a fifth aspect of the present invention, there is provided a downsized projection type liquid crystal display device comprising a color-separation/synthesis optical system including a first retarder stack, a polarizing beamsplitter, and a second retarder stack; a liquid crystal panel for green, a liquid crystal panel for red/blue which displays a red image and a blue image by switching them in a time-sharing manner, an illuminating optical system which can emit a yellow light component and cyan light component by switching them in a time-sharing manner and a projection lens, in which, in the color-separation/synthesis optical system, the first retarder stack is disposed adjacent to a first sideface of the polarizing beamsplitter; a liquid crystal panel for green is disposed adjacent to a second sideface of the polarizing beamsplitter; a liquid crystal panel for red/blue is disposed adjacent to a third sideface of the polarizing beamsplitter; the second retarder stack is disposed adjacent to a fourth sideface of the polarizing beamsplitter; the first sideface and the third sideface of the polarizing beamsplitter face to each other; the second sideface and the fourth sideface of the polarizing beamsplitter face to each other; each of the first retarder stack and the second retarder stack has two cut-off wavelengths in a visible light region; a cut-off wavelength on the short wavelength side of the first retarder stack is on a shorter wavelength side as compared with the cut-off wavelength on the short wavelength of the second retarder stack; and a cut-off wavelength on the long wavelength side of the first retarder stack is on a longer wavelength side as compared with the cut-off wavelength on the long wavelength of the second retarder stack.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

First Embodiment

Figure 1:
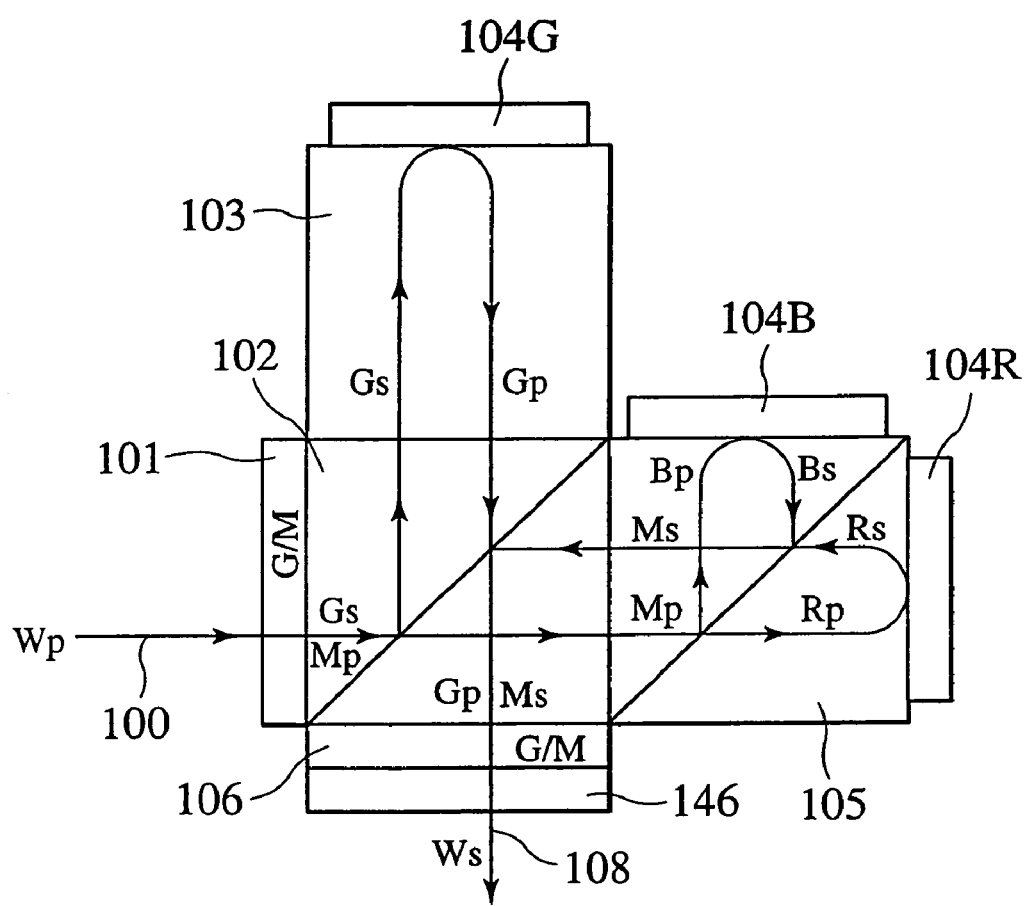
FIG. 1 is a diagram showing a color-separation/synthesis optical system in a projection type liquid crystal display device according to a first embodiment of the present invention.

FIG. 1 is a diagram showing a color-separation/synthesis optical system in a projection type liquid crystal display device in a white display state according to a first embodiment. The color-separation/synthesis optical system in the projection type liquid crystal display device according to the present embodiment includes a first retarder stack 101, a polarizing beamsplitter 102, a spacer 103, liquid crystal panels 104R, 104G and 104B used for the three color light components, respectively, a dichroic beamsplitter 105, a second retarder stack 106 and an emission-side polarizing plate 146. The first retarder stack 101 is disposed adjacent to a first sideface of the polarizing beamsplitter 102; the spacer 103 is disposed adjacent to a second sideface of the polarizing beamsplitter 102; the dichroic beamsplitter 105 is disposed adjacent to a third sideface of the polarizing beamsplitter 102; and the second retarder stack 106 is disposed adjacent to a fourth sideface of the polarizing beamsplitter 102. The polarizing beamsplitter 102 is an optical element which is constructed by bonding two 45-degree prisms together and provided with a dielectric multi-layer film at its bonding interface to transmit and reflect incident light depending on a polarization state with respect to the bonding interface. The liquid crystal panel for green 104G is disposed adjacent to a sideface opposite to the sideface of the polarizing beamsplitter 102 to which the spacer 103 is adjacent. The liquid crystal panel for red 104R is disposed adjacent to a first emission face of the dichroic beamsplitter 105. The liquid crystal panel for blue 104B is disposed adjacent to a second emission face of the dichroic beamsplitter 105. The dichroic beamsplitter 105 used herein is an optical element which is constructed by bonding two 45-degree prisms together and provided with a dielectric multilayer film at its bonding interface to transmit and reflect incident light depending on a wavelength. The dichroic beamsplitter 105 reflects the blue light component and transmits the red light component.

White light 100, which is indicated by Wp in FIG. 1, is emitted from a light source (not shown) to be allowed to enter the polarizing beamsplitter 102 from the side of the first retarder stack 101 as being p-polarized (polarized to be directed in a horizontal direction with respect to the drawing sheet) in advance of the incidence. In the first retarder stack 101, a green wavelength component of Wp is subjected to a phase modulation of π to be an s-polarized light component (polarized to be directed in a vertical direction with respect to the drawing sheet) which will hereafter be referred to as "Gs", while a magenta wavelength component of Wp is not subjected to the phase modulation to remain as a p-polarized light component which will hereafter be referred to as "Mp". "G/M" indicated in FIG. 1 represents a function of subjecting the green (G) wavelength component to the phase modulation and not subjecting the magenta (M) wavelength component to the phase modulation. Gs is then reflected by the interface of the polarizing beamsplitter 102 to be allowed to enter the liquid crystal panel for green 104G through the spacer 103. If the liquid crystal panel for green 104G is in the white display state, Gs is subjected to a modulation of polarization state to be a p-polarized light component (Gp). Gp is then allowed to enter the polarizing beamsplitter 102 through the spacer 103 again, but, in this case, Gp passes through the interface to enter the second retarder stack 106 and then subjected to the π phase modulation to be emitted as an s-polarized light component. In turn, Mp, which is allowed to enter the polarizing beamsplitter 102 through the first retarder stack 101, passes through the polarizing beamsplitter 102 to enter the dichroic beamsplitter 105, so that Mp is separated into a blue light component (Bp) and a red light component (Rp) on the interface of the dichroic beamsplitter 105. The separated blue light component (Bp) is allowed to enter the liquid crystal panel for blue 104B, and the separated red light component (Rp) is allowed to enter the liquid crystal panel for red 104R, so that the blue light and red light components are subjected respectively to the π phase modulation to be s-polarized light components (Bs, Rs) in the white display. Bs and Rs are subjected to a color synthesis by the dichroic beamsplitter 105 again to be magenta (Ms) which is then allowed to enter the polarizing beamsplitter 102 to be reflected by the interface thereof. Ms, which has been reflected by the polarizing beamsplitter 102, is combined with the green light component (Gp) to be allowed to enter the second retarder stack 106. A Gp wavelength component in the incident light is subjected mainly to the π phase modulation to be an s-polarized light component, and the s-polarized light component is then combined with Ms, which has not been subjected to the phase modulation, to be emitted from the second retarder stack 106 as s-polarized white light 108 (Ws). An unnecessary polarization component of the white light, which is emitted from the second retarder stack, is eliminated by the emission-side polarizing plate 146. The white light is projected on a screen or the like by a projection optical system (not shown) to form an image.

Figure 2:
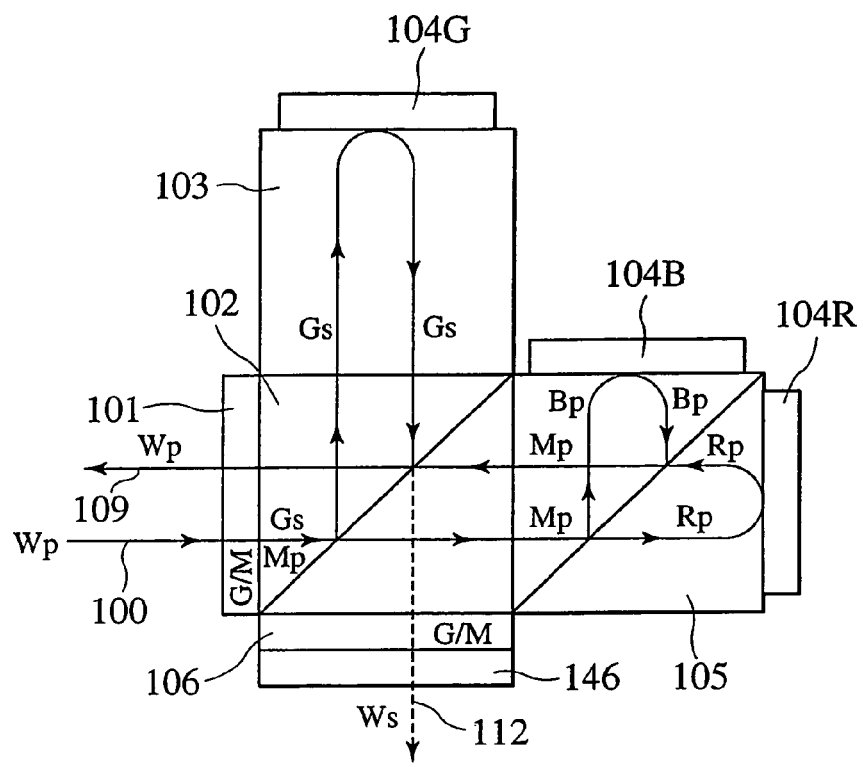
FIG. 2 is a diagram showing a color-separation/synthesis optical system in a projection type liquid crystal display device according to the first embodiment of the present invention.

A projection type liquid crystal display device shown in FIG. 2 has the same configuration as that shown in FIG. 1. FIG. 2 shows a black display state. White light 100 from a light source (not shown), which has been indicated by Wp, is allowed to enter the polarizing beamsplitter from the side of the first retarder stack 101 as being p-polarized (polarized to be directed in a horizontal direction with respect to the drawing sheet) in advance of the incidence. In the first retarder stack 101, a green wavelength component of Wp is subjected to the π phase modulation to be an s-polarized light component, which will hereafter be referred to as "Gs", and a magenta wavelength component of Wp is not subjected to the phase modulation, which will hereafter be referred to as "Wp". Gs is reflected by the interface of the polarizing beamsplitter 102 to enter the liquid crystal panel for green 104G through the spacer 103. When the liquid crystal panel for green 104G is in the black display state, Gs is not subjected to the modulation of polarizing state to remain as the s-polarized light component (Gs). Gs is then allowed to enter the polarizing beamsplitter 102 through the spacer 103 again and reflected by the interface again to enter the first retarder stack 101. Gs is then subjected to the π phase modulation in the first retarder stack 101 to be emitted therefrom as a p-polarized light component. In turn, Mp, which has been allowed to enter the polarizing beamsplitter 102 though the first retarder stack 101, is allowed to enter the dichroic beamsplitter 105 after passing through the polarizing beamsplitter 102 to be separated into a blue light component (Bp) and a red light component (Rp) on the interface of the dichroic beamsplitter 105. The separated blue light component (Bp) enters the liquid crystal panel for blue 104B, and the separated red light component (Rp) enters the liquid crystal panel for red 104R. The blue light and red light components are not subjected to the phase modulation when each of the liquid crystal panels is in the black display state to remain as the p-polarized light components (Bp and Rp). Bp and Rp are subjected to a color synthesis by the dichroic beamsplitter 105 again to be magenta (Mp) and enters the polarizing beamsplitter 102 to pass through the interface thereof. Mp, which has passed through the polarizing beamsplitter 102, is combined with the green light component (Gs) to enter the first retarder stack 101. A Gs wavelength component in the incident light is mainly subjected to the π phase modulation to be a p-polarized light component, and then the p-polarized light component is combined with Mp, which has not been subjected to the phase modulation, to be emitted from the first retarder stack as p-polarized white light 109 (Wp). Since the white light 109 returns in a direction of the light source, black is displayed on the screen. Since a p-polarization transmittivity of the polarizing beamsplitter 102 is not 100%, there is a small amount of light component which is reflected by the interface thereof to advance toward the second retarder stack 106; however, such light component does not affect on the contrast ratio since it is eliminated by the emission-side polarizing plate 146 which is disposed adjacent to the second retarder stack 106. Nevertheless, if a phase modulation occurs in the liquid crystal panels 104G, 104R and 104B, a light component emitted from the second retarder stack 106 cannot be eliminated by the emission-side polarizing plate 146 to be a leaked light component 112 which raises a brightness level of the black display on screen to undesirably result in a reduction in contrast ratio. Therefore, it is necessary to regulate the phase modulation at the time of the black display in the liquid crystal panels 104G, 104R and 104B to be as small as possible.

Figure 14:
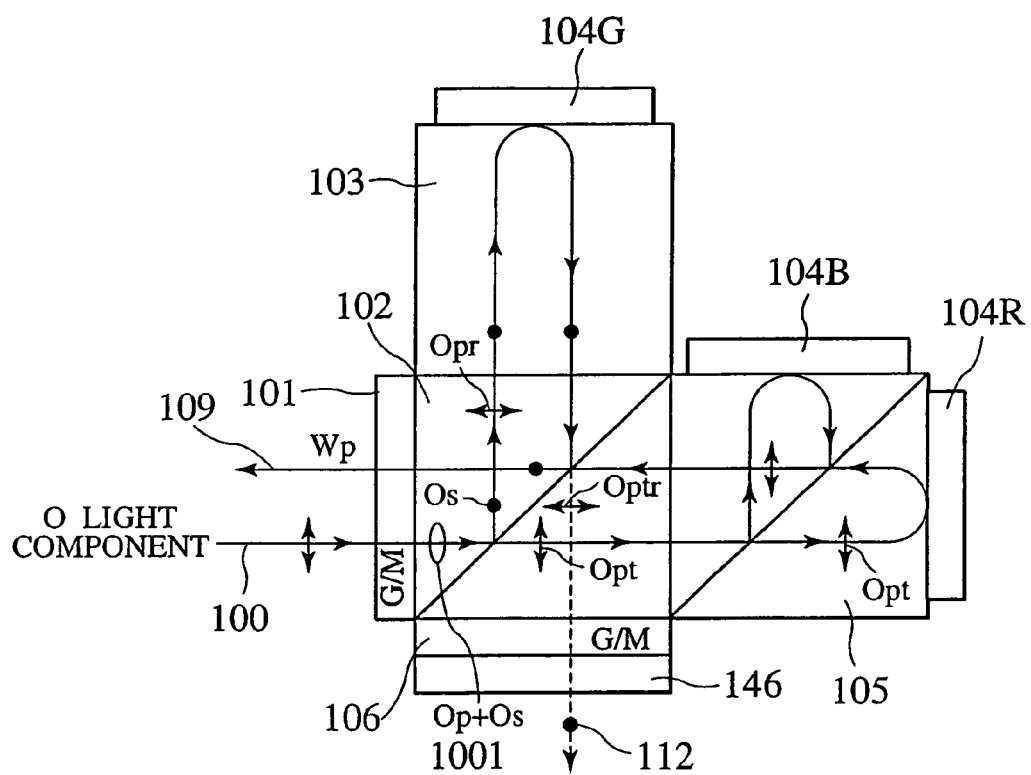
FIG. 14 is a diagram showing an optical leakage (O light component) taking an example from a boundary wavelength region between a green light and a red light according to the sixth embodiment of the present invention.

There are other causes for the leaked light component 112 than the unnecessary phase modulation in the liquid crystal panels 104G, 104R and 104B. The major cause of the reduction in contrast ratio is the optical leakage in the boundary wavelength regions of the three color light components. The following are two major causes for the optical leakage in the boundary wavelength regions of the three color light components. One is characteristics of a retarder stack in the vicinity of a cut-off wavelength. The cut-off wavelength of retarder stack means a wavelength on the border between a wavelength region having a phase modulation of 0 and a wavelength region having a phase modulation of π, which has a phase modulation of π/2. Since a value of the phase modulation ranges from 0 to π in the vicinity of the cut-off wavelength of the retarder stack, a linearly polarized light component which has entered the retarder stack is emitted therefrom as an elliptically polarized light component. The other cause is characteristics of a polarizing beamsplitter with respect to a p-polarized light component. The polarizing beamsplitter 102 has good reflection characteristics with respect to an s-polarized light component, while it cannot obtain a sufficient ratio between the transmission characteristics and the reflection characteristics with respect to the p-polarized light component. More specifically, a reflectivity of the polarizing beamsplitter 102 with respect to the s-polarized light component is not less than 99.99%, while a transmittivity thereof with respect to the p-polarized light component is as small as about 80% to 90%, so that the polarizing beamsplitter 102 reflects about 10% to 20% of the p-polarized light. Details of the occurrence of optical leakage due to the above two causes will be described with reference to FIG. 14, taking an example from a boundary wavelength region of the green and red light components (O light component).

The O light component in the p-polarized white light 100 becomes an elliptically polarized light component 1001 after passing through the retarder stack 101. An s-polarized light component (Os) of the elliptically polarized light component is reflected by the interface of the polarizing beamsplitter 102 to advance toward the panel for green 104G. Since the reflected light component is reflected again by the interface of the polarizing beamsplitter 102, it does not become the leaked light component 112. In turn, a p-polarized light component (Op) of the elliptically polarized light component is separated into a component (Opt) which passes through the interface of the polarizing beamsplitter 102 and a component (Opr) which is reflected by the polarizing beamsplitter 102. Opt then enters the liquid crystal panel for red 104R through the dichroic beamsplitter 105. Since the liquid crystal panel for red 104R is in the black display state, the polarization state of Opt is not modulated, so that Opt reaches the interface of the polarizing beamsplitter 102 again. The leaked light component 112 is not generated since a major part of Opt is transmitted through the polarizing beamsplitter 102; however, 10% to 20% of the Opt (Optr) is reflected by the interface of the polarizing beamsplitter 102 to advance toward the second retarder stack 106. The purpose of the emission-side polarizing plate 146 which is disposed adjacent to the second retarder stack 106 is to eliminate unnecessary light components which are in polarization states other than that different from a polarization state of an image light. Here, the emission-side polarizing plate 146 serves to transmit the s-polarized light component and eliminate the p-polarized light component. If Optr is modulated by the second retarder stack 106 to be converted from the p-polarized light component into the s-polarized light component, the s-polarized light component passes through the emission-side polarizing plate 146 to become the leaked light component 112. In order to prevent the generation of the leaked light component 112, the first and the second retarder stack 101 and 106 in the projection type liquid crystal display device are configured as follows.

Figure 3:
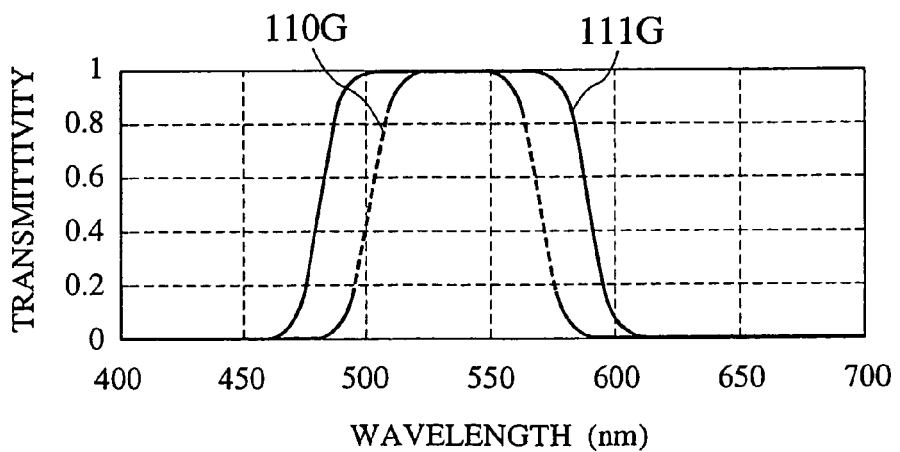
FIG. 3 shows wavelength characteristics of a first and a second retarder stack according to the first embodiment of the present invention.
Figure 4:
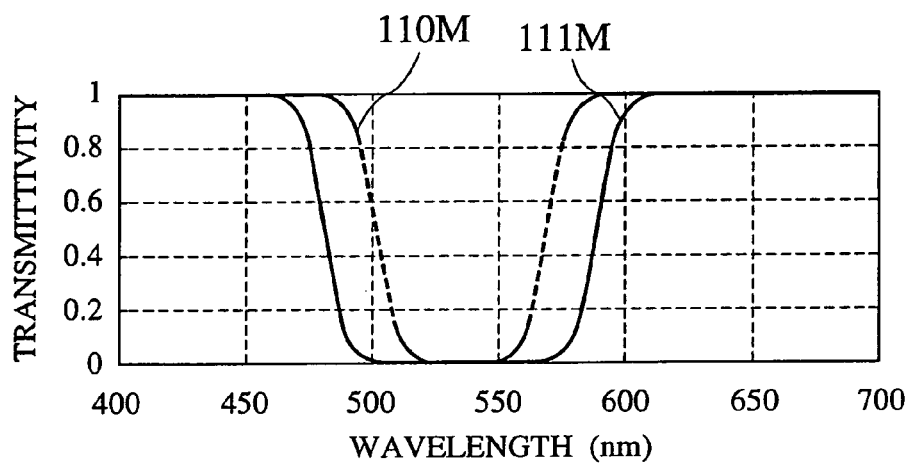
FIG. 4 shows wavelength characteristics of a first and a second retarder stack according to the first embodiment of the present invention.

FIGS. 3 and 4 show characteristic curves of the first and second retarder stacks 101 and 106 in the projection type liquid crystal display device of the present invention. FIG. 3 shows transmittivities of the first retarder stack 101 and the second retarder stack 106 when they are disposed in a cross-Nicole state for polarization, and the curves of the first and the second retarder stack 101 and 106 are denoted by 110G and 110G. FIG. 4 shows transmittivities of the first retarder stack 101 and the second retarder stack 106 when they are disposed in a parallel-Nicole state for polarization, and the curves of the first and the second retarder stack 101 and 106 are denoted by 111M and 110M, respectively. The first and the second retarder stack 101 and 106 in the projection type liquid crystal display device of the present invention are characterized in that cut-off wavelengths of the second retarder stack 106 are different from those of the first retarder stack 101.

Further, the first and the second retarder stacks 101 and 106 are characterized in that a bandwidth, which is a difference between two cut-off wavelengths of the second retarder stack 106, is in a narrower band as compared with a bandwidth of the first retarder stack 101.

Also, the first and the second retarder stack 101 and 106 are characterized in that the cut-off wavelength on the short wavelength side in the second retarder stack 106 is located on a longer wavelength side as compared with the cut-off wavelength on the short wavelength side in the first retarder stack 101, and that the cut-off wavelength on the long wavelength side in the second retarder stack 106 is located on a shorter wavelength side as compared with the cut-off wavelength on the long wavelength side in the first retarder stack 101.

With this configuration, Opt, which has otherwise become the unnecessary light component, does not become the unnecessary light component 112 since substantially whole part of Opt is not subjected to the phase modulation to enable Opt to maintain the p-polarization state to be eliminated by the emission-side polarizing plate 146 which is disposed between the second retarder stack 106 and the projection optical system.

Figure 5:
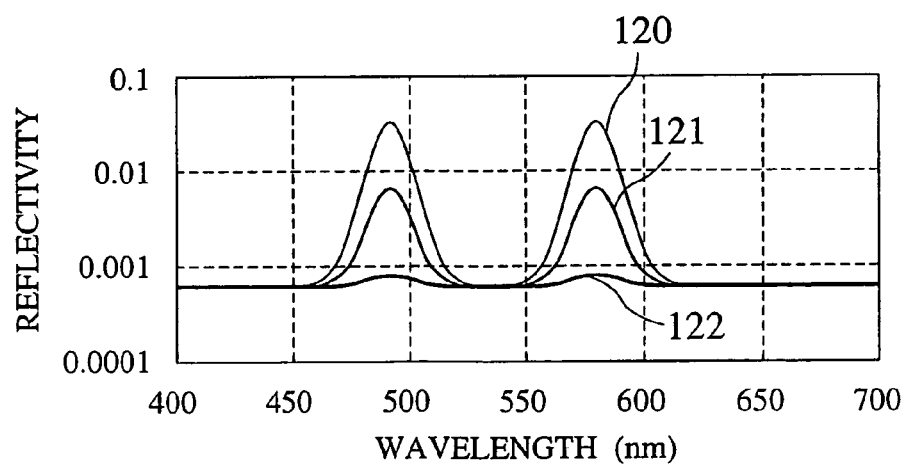
FIG. 5 shows spectrums obtained when displaying a black image according to the first embodiment of the present invention.

FIG. 5 shows spectrums of the leaked light component 112 obtained when a difference between the cut-off wavelength on the long wavelength side of the first retarder stack 101 and the cut-off wavelength on the long wavelength side of the second retarder stack 106 and a difference Δλ between the cut-off wavelength on the short wavelength side of the first retarder stack 101 and the cut-off wavelength on the short wavelength side of the second retarder stack 106 are respectively set to be 0 nm, 5 nm and 10 nm. Spectrums 120, 121 and 122 shown in FIG. 5 are results obtained by setting the difference Δλ to be 0 nm, 5 nm and 10 nm, respectively. It is apparent from FIG. 5 that intensity of the leaked light component 112 in each of boundary wavelength regions of the three color light components can effectively be reduced by increasing the difference Δλ between the cut-off wavelengths of the first and the second retarder stack.

Figure 6A:
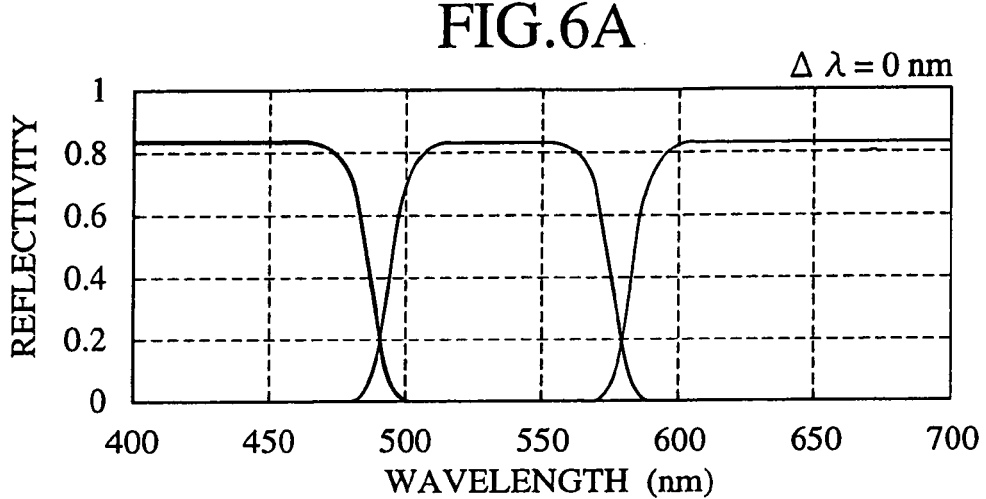
FIGS. 6A to 6C show spectrums obtained when displaying a white image according to the first embodiment of the present invention.
Figure 6B:
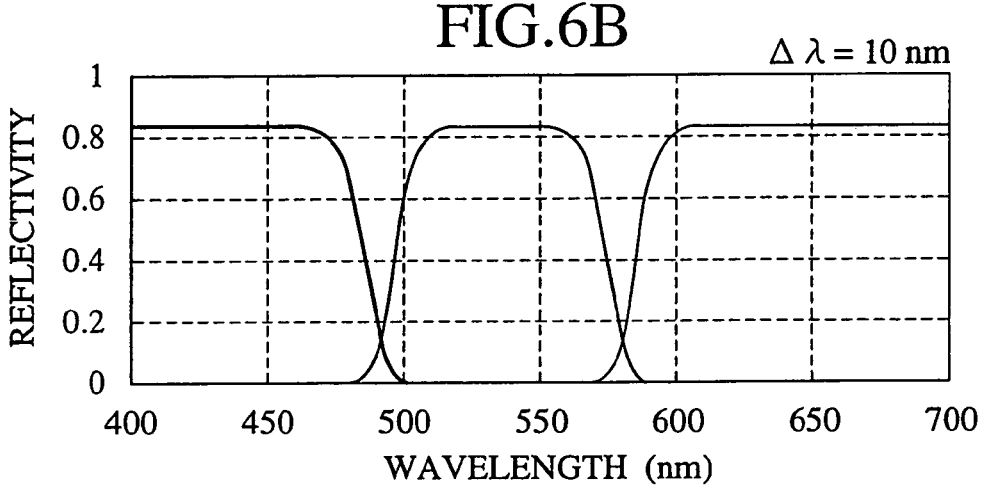
Figure 6C:
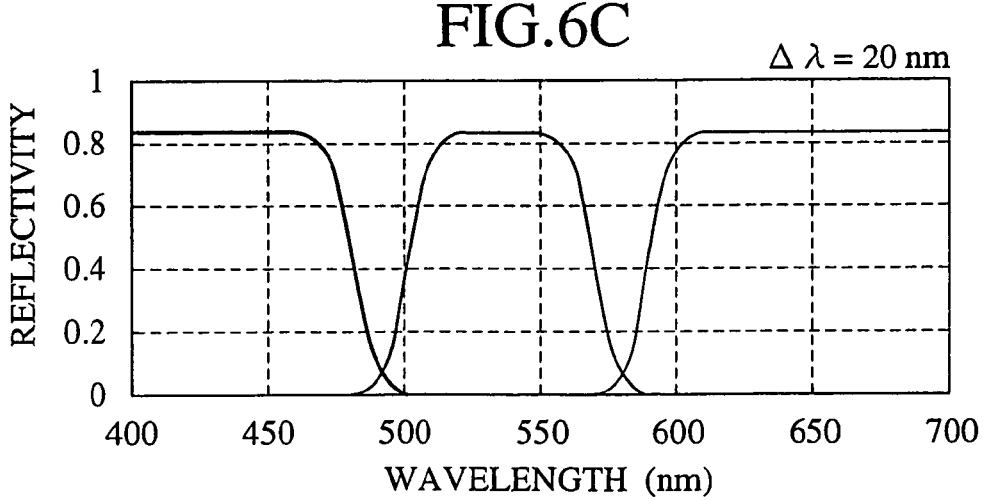

Another effect achieved by setting the difference Δλ between the cut-off wavelengths of the first and the second retarder stack is an improvement in color purity. FIGS. 6A to 6C show spectrums obtained by setting the difference Δλ between the cut-off wavelengths of the first and the second retarder stack to 0 nm, 5 nm and 10 nm, respectively. A light component in each of the boundary wavelength regions of the three color light components deteriorates the color purity; however, as is apparent from FIG. 6, light intensity in each of the boundary wavelength regions of the three color light components can be reduced by increasing the difference Δλ, thereby making it possible to perform an excellent color separation of the three color light components, which improves the color purity.

Figure 7:
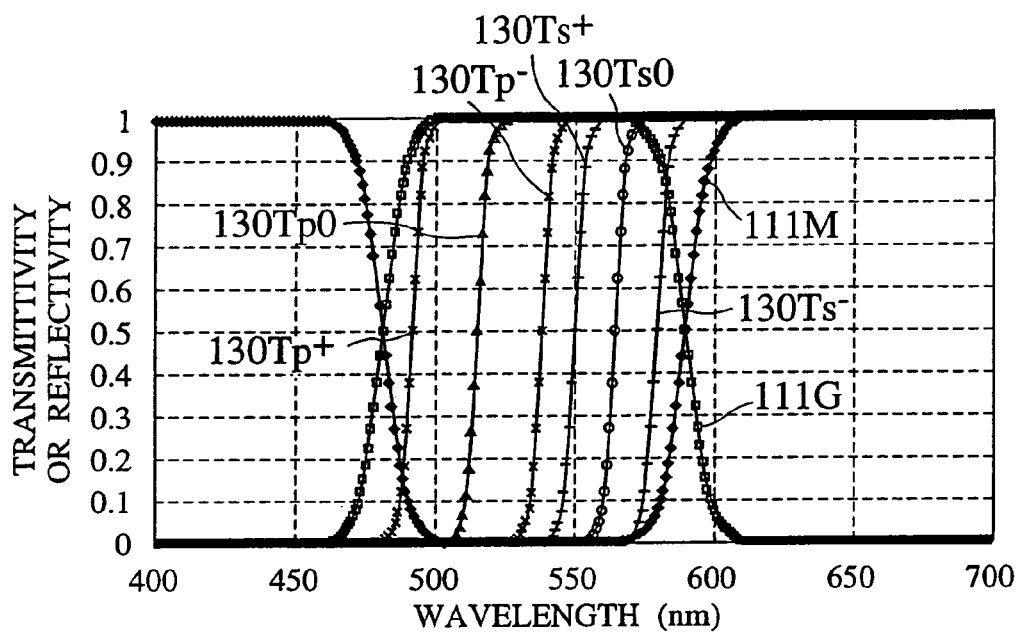
FIG. 7 shows wavelength characteristics of a dichroic beamsplitter and a first retarder stack according to the first embodiment of the present invention.

FIG. 7 is a diagram showing a relationship between the wavelength characteristics of the dichroic beamsplitter 105 used in the color-separation/synthesis optical system of the present embodiment and the wavelength characteristics of the first retarder stack 101. The cut-off wavelength according to a transmittivity and a reflectivity of the dichroic beamsplitter has polarization dependency and incident angle dependency. A spectrum 130Tp0 denotes a transmittivity of a p-polarized light component in a direction along an optical axis on an interface of the dichroic beamsplitter, and 130Tp+ and 130Tp− denote transmission spectrums with respect to p-polarized light components (corresponding to an f-number of about 2) at angles diverted by 14 degrees to a positive direction and a negative direction from the direction along the optical axis, respectively. Spectrums 130Ts0, 130Ts+ and 130Ts− denotes transmission spectrums with respect to s-polarized light components which are obtained under the same settings as those for the p-polarized light components. As can be seen from FIG. 7, the cut-off wavelength with respect to the p-polarized light component is on the shorter wavelength side as compared with the cut-off wavelength with respect to the s-polarized light component. Also, the cut-off wavelength obtained by diverting the incident angle to the positive direction from the direction along the optical axis is on the shorter wavelength side as compared to that obtained by diverting the incident angle to the negative direction. The present embodiment is characterized by placing both of the cut-off wavelengths of transmission spectrums of the dichroic beamsplitter 105 between the cut-off wavelength on the long wavelength side and the cut-off wavelength on the short wavelength side of the first retarder stack 101. If the cut-off wavelengths of transmission spectrums of the dichroic beamsplitter 105 are outside the cut-off wavelengths on the long wavelength side and the short wavelength side of the first retarder stack 101, a light component in an wavelength region outside the cut-off wavelengths of the first retarder stack becomes an asymmetric loss with respect to the angle diverted from the optical axis to cause the so-called color shading wherein brightness gradients for each of the three color light components are varied in a projected image. Therefore, it is possible to effectively prevent the occurrence of the color shading by placing the cut-off wavelengths of transmission spectrums of the dichroic beamsplitter between the cut-off wavelengths on the long wavelength side and the short wavelength side of the first retarder stack 101.

Second Embodiment

Figure 8:
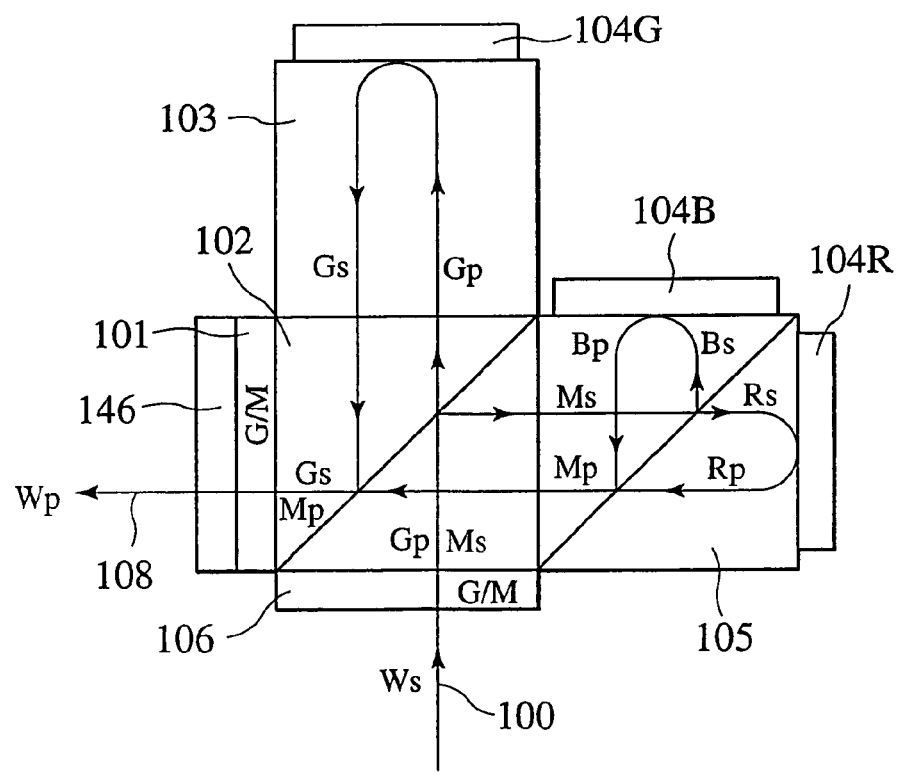
FIG. 8 is a diagram showing a color-separation/synthesis optical system in a projection type liquid crystal display device according to a second embodiment of the present invention.
Figure 9:
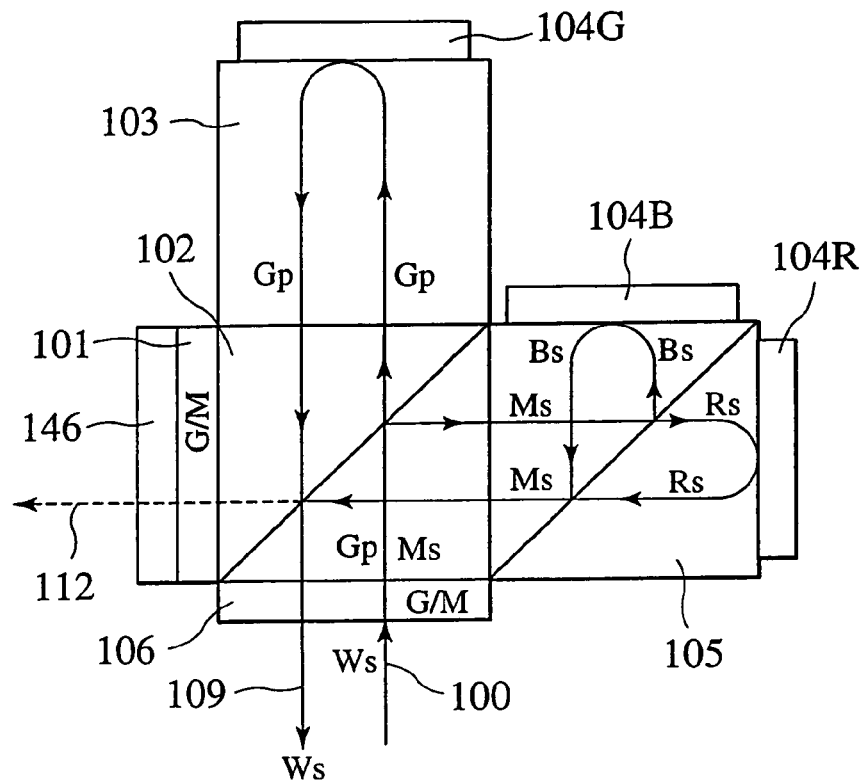
FIG. 9 is a diagram showing a color-separation/synthesis optical system in a projection type liquid crystal display device according to the second embodiment of the present invention.

FIGS. 8 and 9 each show a color-separation/synthesis optical system in a projection type liquid crystal display device according to a second embodiment. FIG. 8 shows a white display state, while FIG. 9 shows a black display state. A major difference between the color-separation/synthesis optical systems of the first and the second embodiment is that white light 100 emitted from a light source enters the color-separation/synthesis optical system from the side of a second retarder stack 106 to take out an image light from the side of the first retarder stack 101 in the present embodiment. Since there is the problem of the unnecessary light in the color-separation/synthesis optical system of the present embodiment as is detected with the first embodiment, cut-off wavelengths on the long wavelength side and the short wavelength side of the first retarder stack 101 are set to be different from those of the second retarder stack 106. More specifically, the first retarder stack 101 and the second retarder stack 106 in the projection type liquid crystal display device of the present invention are characterized by setting the cut-off wavelengths of the second retarder stack 106 to be different from those of the first retarder stack 101.

Also, a bandwidth, which is a difference between the two cut-off wavelengths of the second retarder stack 106, is in a narrower band as compared with a bandwidth of the first retarder stack 101.

Further, the cut-off wavelength on the short wavelength side in the second retarder stack 106 is placed on a longer wavelength side as compared with the cut-off wavelength on the short wavelength side in the first retarder stack 101, while the cut-off wavelength on the long wavelength side in the second retarder stack 106 is placed on a shorter wavelength side as compared with the cut-off wavelength on the long wavelength side in the first retarder stack 101.

Third Embodiment

Figure 10:
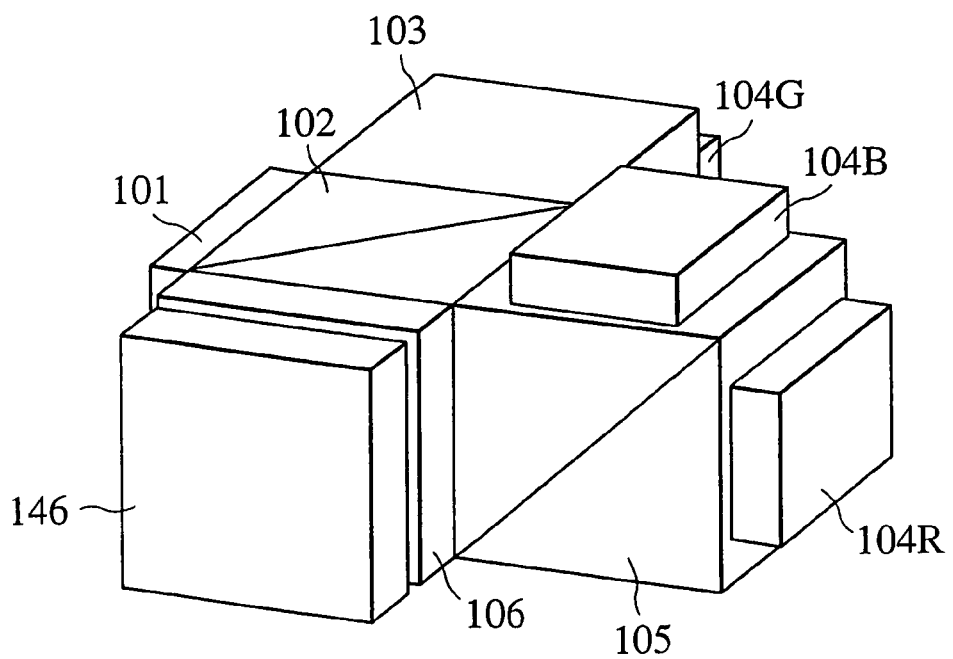
FIG. 10 is a diagram showing a color-separation/synthesis optical system in a projection type liquid crystal display device according to a third embodiment of the present invention.

FIG. 10 shows a color-separation/synthesis optical system in a projection type liquid crystal display device according to a third embodiment. The present embodiment is characterized by disposing a surface including optical axes of light components passing through and reflected by a bonding interface of a polarizing beamsplitter 102 in such a manner as to form an angle of substantially 90 degrees with a surface including optical axes of light components passing through and reflected by a bonding interface of a dichroic beamsplitter 105. A shape of a display of a liquid crystal panel is typically oblong and, further, the shape may be more laterally elongated such as that of a high quality television having an aspect ratio of 9:16. With the configuration of the present embodiment, it is possible to drastically reduce the size of the dichroic beamsplitter 105, which enables the size of the whole optical system to be reduced.

Fourth Embodiment

Figure 11:
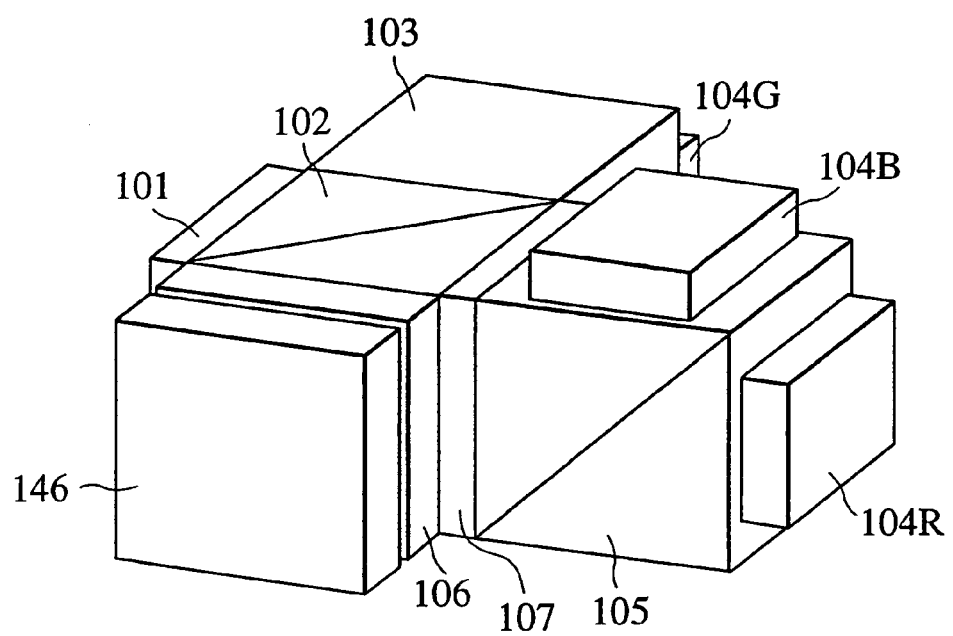
FIG. 11 is a diagram showing a color-separation/synthesis optical system in a projection type liquid crystal display device according to a fourth embodiment of the present invention.

FIG. 11 shows a color-separation/synthesis optical system in a projection type liquid crystal display device according to a fourth embodiment. The present embodiment is a modification of the third embodiment, which is characterized by disposing a third retarder stack 107 between a polarizing beamsplitter 102 and a dichroic beamsplitter 105. The third retarder stack 107 subjects a red light component to a $\pi$ phase modulation, and a phase modulation thereof for a blue light component is substantially 0. Since a surface including optical axes of light components passing through and reflected by a bonding interface of the polarizing beamsplitter 102 is disposed in such a manner as to form an angle of substantially 90 degrees with a surface including optical axes of light components passing through and reflected by a bonding interface of the dichroic beamsplitter 105, a p-polarized light component, which enters the dichroic beamsplitter 105 through the polarizing beamsplitter 102 in the third embodiment, becomes an s-polarized light with respect to the clad interface of the dichroic beamsplitter 105, and the converse is also possible. In the color-separation/synthesis optical system of the present embodiment, the s-polarized light component which has been reflected by the bonding interface of the dichroic beamsplitter 105 enters a liquid crystal panel for blue 104B, while the p-polarized light component which has passed through the bonding interface of the dichroic beamsplitter 105 enters a liquid crystal panel for red 104R.

As described in the first embodiment, the dichroic beamsplitter 105 has the polarization dependency and the incident angle dependency. A cut-off wavelength of the dichroic beamsplitter 105 for the p-polarized light component is on a shorter wavelength side as compared with a cut-off wavelength for the s-polarized light component, and the cut-off wavelengths have different incident dependencies. In other words, the cut-off wavelength for the p-polarized light component is on the wavelength side which is closer to blue as compared with the cut-off wavelength for the s-polarized light component. As a result of providing the third retarder stack 107, illumination on the panel for blue 104B becomes an s-polarized light component with respect to the bonding interface of the dichroic beamsplitter 105 and, therefore, the illumination is immune to the incident angle dependency of the cut-off wavelength with respect to the s-polarized light component of the dichroic beamsplitter 105 which is on the wavelength side closer to red. Further, illumination on the panel for red 104R becomes a p-polarized light component with respect to the bonding interface of the dichroic beamsplitter 105 and, therefore, the illumination is immune to the incident angle dependency of the cut-off wavelength with respect to p-polarized light component of the dichroic beamsplitter 105 which is on the wavelength side closer to the blue. Therefore, the present embodiment effectively prevents occurrences of stray light such as unnecessary reflected light which are due to the polarization dependency and the incident angle dependency of the dichroic beamsplitter 105, thereby making it possible to realize a projection type liquid crystal display device having a high degree of contrast ratio.

Fifth Embodiment

Figure 12:
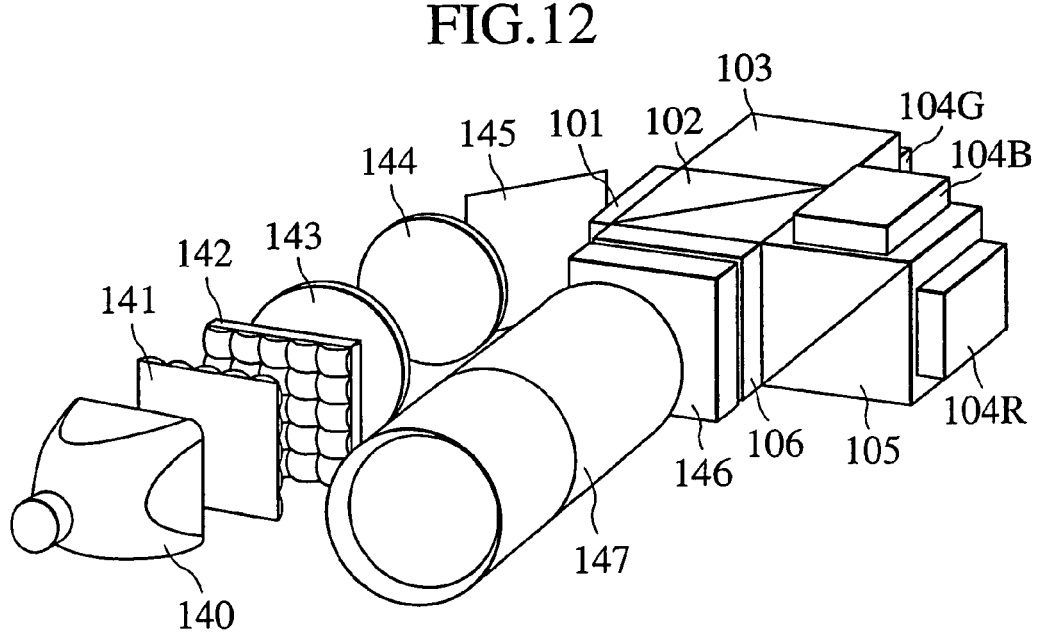
FIG. 12 is a diagram showing the projection type liquid crystal display device according to the fourth embodiment of the present invention.

FIG. 12 is a schematic diagram showing a projection type liquid crystal display device according to a fifth embodiment. The projection type liquid crystal display device of the present embodiment is constituted mainly by a white light source 141, an optical integrators 141 and 142, lenses 143 and 144, an illuminating optical system including a mirror 145, any one of the color-separation optical systems described in the first to fourth embodiments, and a projection lens 147.

White light which is emitted from the white light source 141 illuminates liquid crystal panels 104 with highly uniform illumination intensity by the optical integrators 141 and 142, lenses 143 and 144 and mirror 145 through the color-separation/synthesis optical system which is described in any one of the first to fourth embodiments. Three color light components which have been modulated by the liquid crystal panels 104 pass through the color-separation/synthesis optical system which is described in any one of the first to fourth embodiments again to be projected by the projection lens 147. Although not shown in FIG. 12, if a polarization conversion element is provided in the illuminating optical system, light utilization efficiency is increased to thereby improve brightness.

Sixth Embodiment

Figure 13:
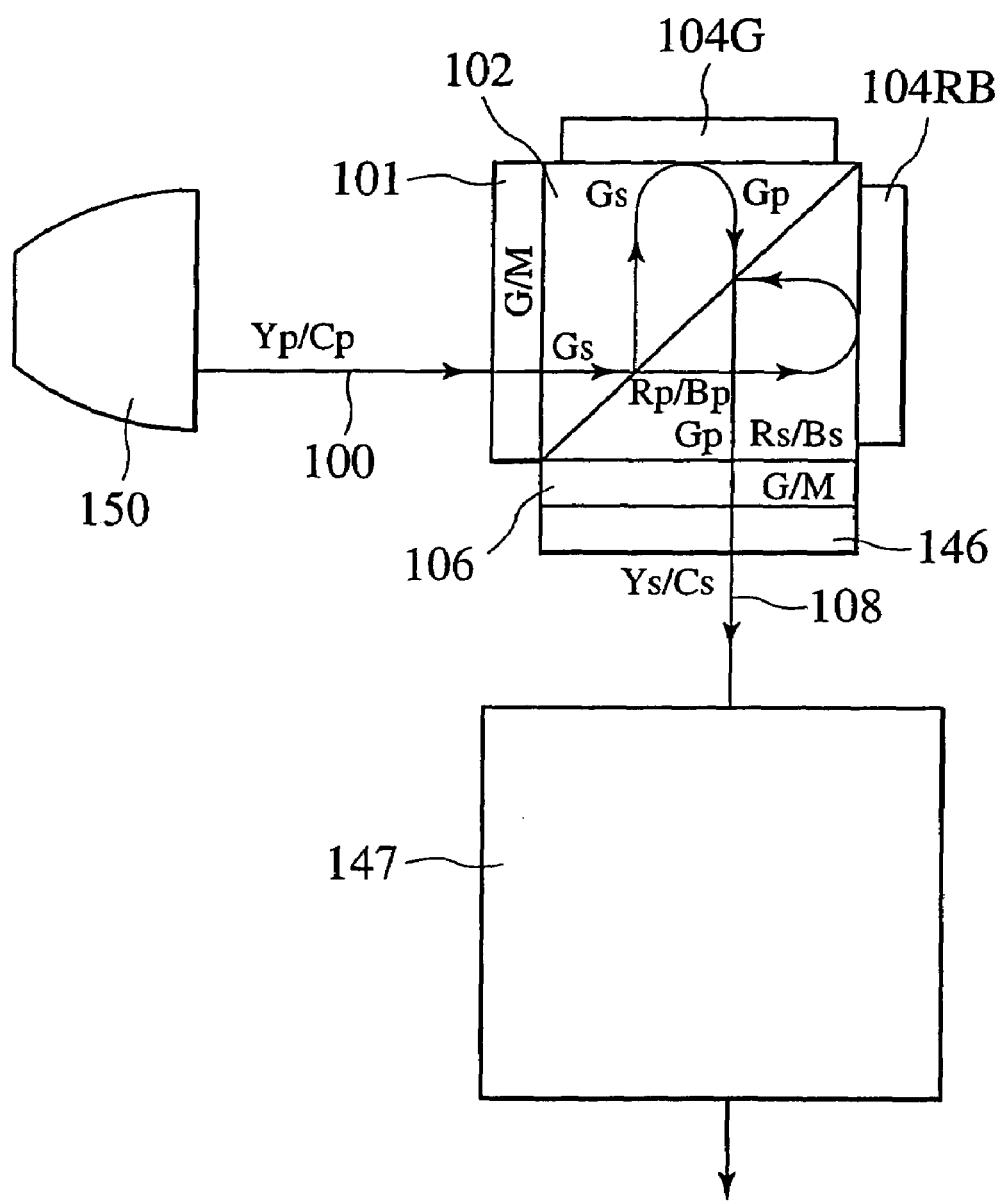
FIG. 13 is a diagram showing a color-separation/synthesis optical system in a projection type liquid crystal display device according to a sixth embodiment of the present invention.

FIG. 13 is a schematic diagram showing a projection type liquid crystal display device according to a sixth embodiment. The projection type liquid crystal display device of the present embodiment includes a first retarder stack 101, a polarizing beamsplitter 102, a second retarder stack 106, a color-separation/synthesis optical system including an emission-side polarizing plate 146, a liquid crystal panel for green 104G, a liquid crystal panel for red/blue 104RB which displays a red image and a blue image by switching them in a time-sharing manner, an illuminating optical system 150 which can emit a yellow light component and a cyan light component by switching them in a time-sharing manner and a projection lens 147. The first retarder stack 101 is disposed adjacent to a first sideface of the polarizing beamsplitter 102; the panel for green 104G is disposed adjacent to a second sideface of the polarizing beamsplitter 102; the liquid crystal panel for red/blue 104RB is disposed adjacent to a third sideface of the polarizing beamsplitter 102; and the second retarder stack 106 is disposed adjacent to a fourth sideface of the polarizing beamsplitter 102. The first and third sidefaces of the polarizing beamsplitter 102 face to each other, and the second and fourth sidefaces thereof face to each other. Each of the first retarder stack 101 and the second retarder stack 106 has two cut-off wavelengths in a visible light region; the cut-off wavelength on the short wavelength side of the first retarder stack 101 is on a shorter wavelength side as compared with the cut-off wavelength on the short wavelength side of the second retarder stack 106; the cut-off wavelength on the long wavelength side of the first retarder stack 101 is on a longer wavelength side as compared with the cut-off wavelength on the long wavelength side of the second retarder stack 106.

FIG. 13 shows a configuration in which illumination light 100 from the illuminating optical system 150 enters the color-separation/synthesis optical system from the side of the first retarder stack 101, and emitted light 108 from the second retarder stack 106 is projected by the projection lens 147. The emission-side polarizing plate 146 is disposed adjacent to the second retarder stack 106. In contrast to this, the emission-side polarizing plate 146 is disposed adjacent to the first retarder stack 101 in a structure where light 100 from the illuminating optical system 150 enters the color-separation/synthesis from the side of the second retarder stack 106, and emitted light 108 from the side of the first retarder stack 101 is projected by the projection lens 147.

The projection type liquid crystal display device separates the light 100 from the illuminating optical system 150, which can emit the yellow light component (Yp) and the cyan light component (Cp) by switching them in the time-sharing manner, into a green light component (Gs) and a red light component (Rp) or a green light component (Gs) and a blue light component (Bp) by the first retarder stack 101 and the polarizing beamsplitter 102, to allow the separated light components respectively to enter the liquid crystal panel for green 104G and liquid crystal panel 104R/B. The liquid crystal panel for green 104G constantly modulates the green light component to display a green image, while the liquid crystal panel for red/blue 104RB displays a red image and a blue image by switching them at high speed in the time-sharing manner in synchronization with the changes in color of illumination. The emitted light 108 becomes a yellow light component (Ys) or a cyan light component (Cs) as a result of timely synthesizing the green light component (Gp) and red light component (Rs) or the green light component (Gp) and blue light component (Bs), and the yellow light component and the cyan light component are switched over to each other with high speed in the time-sharing manner to be projected by the projection lens. Since the yellow image and the cyan image are displayed as being switched over to each other with high speed, a viewer recognizes them as a color-synthesized full color image.

As compared with the prior art wherein two panels of the liquid crystal panel for red and the liquid crystal panel for blue are required, the present embodiment reduces the size of the color-separation/synthesis optical system by the use of the liquid crystal panel for red/blue 104RB which can display the red image and the blue image by switching them in the time-sharing manner, thereby drastically miniaturizing the projection type liquid crystal display device.

Also, since the cutoff wavelengths of the first retarder stack 101 and the cut-off wavelengths of the second retarder stack 106 are defined as described above, the present embodiment drastically reduces the optical leakage in the boundary wavelength regions of the three color light components, thereby realizing a projection type liquid crystal display device having a high contrast ratio.

Since the color-separation/synthesis optical system of the present invention comprising a first retarder stack, a polarizing beamsplitter, a spacer, a dichroic beamsplitter and a second retarder stack is characterized in that the first retarder stack is disposed adjacent to a first sideface of the polarizing beamsplitter; the spacer is disposed adjacent to a second sideface of the polarizing beamsplitter; the dichroic beamsplitter is disposed adjacent to a third sideface of the polarizing beamsplitter; the second retarder stack is disposed adjacent to a fourth sideface of the polarizing beamsplitter; the first sideface and the third sideface of the polarizing beamsplitter face to each other; the second sideface and the fourth sideface of the polarizing beamsplitter face to each other; each of the first retarder stack and the second retarder stack has two cut-off wavelengths in a visible light region; the cut-off wavelength on the short wavelength side of the first retarder stack is on a shorter wavelength side as compared with the cut-off wavelength on the short wavelength of the second retarder stack; and the cut-off wavelength on the long wavelength side of the first retarder stack is on a longer wavelength side as compared with the cut-off wavelength on the long wavelength of the second retarder stack, the color-separation synthesis optical system effectively prevents optical leakage in boundary wavelength regions of three color light components principally; effectively eliminates unnecessary wavelength components which deteriorate color purity in boundary wavelength regions of three color light components, thereby realizing a projection type liquid crystal display device capable of displaying images at a high contrast ratio and a high degree of color purity.

In the color-separation/synthesis optical system in the projection type liquid crystal display device, a face including optical axes of light components passing through and reflected by a bonding interface of the polarizing beamsplitter is disposed in such a manner as to form an angle of substantially 90 degrees with a face including optical axes of light components passing through and reflected by a bonding interface of the dichroic beamsplitter. Therefore, even in the case of using a liquid crystal panel for performing an oblong display such as that of a high quality television having an aspect ratio of 9:16, it is unnecessary to enlarge the size of the color-separation/synthesis optical system, thereby realizing a compact projection type liquid crystal display device.

Further, since a third retarder stack having a function of shifting a phase of a red light component by $\pi$ with respect to that of a blue light component is disposed between the polarizing beamsplitter and the dichroic beamsplitter, the present invention effectively prevents occurrence of stray light otherwise caused by the polarization dependency and the incident angle dependency of the dichroic beamsplitter to thereby realize a projection type liquid crystal device having a high contrast ratio.

What is claimed is:

1. A projection type liquid crystal display device at least comprising:
a color-separation/synthesis optical system comprising:
a first retarder stack, a polarizing beamsplitter, a spacer, a dichroic beamsplitter and a second retarder stack, whererin
the first retarder stack is disposed adjacent to a first sideface of the polarizing beamsplitter;
the spacer is disposed adjacent to a second sideface of the polarizing beamsplitter;
the dichroic beamsplitter is disposed adjacent to a third sideface of the polarizing beamsplitter;
the second retarder stack is disposed adjacent to a fourth sideface of the polarizing beamsplitter;
the first sideface and the third sideface of the polarizing beamsplitter face to each other;
the second sideface and the fourth sideface of the polarizing beamsplitter face to each other;
each of the first retarder stack and the second retarder stack has two cut-off wavelengths in a visible light region;
a cut-off wavelength on the short wavelength side of the first retarder stack is on a shorter wavelength side as compared with the cut-off wavelength on the short wavelength of the second retarder stack; and
a cut-off wavelength on the long wavelength side of the first retarder stack is on a longer wavelength side as compared with the cut-off wavelength on the long wavelength of the second retarder stack;
a white light source;
a plurality of liquid crystal panels for three color light components; and
a projection lens, wherein
illumination light from the white light source is converted into a p-polarized light component with respect to a bonding interface of the polarizing beamsplitter;
the illumination light from the white light source is allowed to enter the polarizing beamsplitter from the first retarder stack-side;
a liquid crystal panel for green is disposed on a face opposite to the sideface of the polarizing beamsplitter to which the spacer is adjacent;
a liquid crystal panel for red is disposed on a first emission face of the dichroic beamsplitter;
a liquid crystal panel for blue is disposed on a second emission face of the dichroic beamsplitter; and
an emission-side polarizing plate and the projection lens are disposed adjacent to the second retarder stack in this order.

2. The projection type liquid crystal display device according to claim 1, wherein
the color-separation/synthesis optical system of the projection type liquid crystal display device comprises
a face including optical axes of light components passing through and reflected by the clad interface of the polarizing beamsplitter and a face including optical axes of light components passing through and reflected by the bonding interface of the dichroic beamsplitter, the faces being disposed in such a manner as to form an angle of about 90 degrees with each other.

3. The projection type liquid crystal display device according to claim 2, wherein the color-separation/synthesis optical system of the projection type liquid crystal display device comprises a third retarder stack which is disposed between the polarizing beamsplitter and the dichroic beamsplitter.

* * * * *